(12) United States Patent
Sugizaki et al.

(10) Patent No.: US 12,480,923 B2
(45) Date of Patent: Nov. 25, 2025

(54) CHEMICAL SENSOR SYSTEM

(71) Applicant: Kabushiki Kaisha Toshiba, Tokyo (JP)

(72) Inventors: Yoshiaki Sugizaki, Kanagawa (JP); Hiroshi Hamasaki, Kanagawa (JP); Ko Yamada, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 360 days.

(21) Appl. No.: 18/174,854

(22) Filed: Feb. 27, 2023

(65) Prior Publication Data
US 2024/0077464 A1 Mar. 7, 2024

(30) Foreign Application Priority Data
Sep. 7, 2022 (JP) .................. 2022-142256

(51) Int. Cl.
*G01N 33/00* (2006.01)
*G01N 1/22* (2006.01)

(52) U.S. Cl.
CPC ....... *G01N 33/0032* (2013.01); *G01N 1/2273* (2013.01); *G01N 33/0018* (2013.01)

(58) Field of Classification Search
CPC .......... G01N 33/0032; G01N 33/0018; G01N 1/2273
See application file for complete search history.

(56) References Cited

U.S. PATENT DOCUMENTS

| | | | |
|---|---|---|---|
| 2004/0082872 A1 | 4/2004 | Von Bahr et al. | |
| 2020/0086323 A1 | 3/2020 | Hongo et al. | |
| 2021/0080416 A1 | 3/2021 | Sugizaki et al. | |
| 2021/0302346 A1* | 9/2021 | Tobjork | G01N 33/0031 |
| 2022/0276198 A1 | 9/2022 | Sugizaki | |
| 2022/0276200 A1 | 9/2022 | Sugizaki et al. | |

FOREIGN PATENT DOCUMENTS

| | | | | |
|---|---|---|---|---|
| CN | 113960255 A | * | 1/2022 | |
| FR | 2957150 A1 | * | 9/2011 | .............. C12Q 1/04 |
| GB | 2155184 A | * | 9/1985 | ......... G01N 33/0013 |
| JP | 3032831 B2 | * | 4/2000 | |
| JP | 2004212358 A | | 7/2004 | |
| JP | 2005538819 A | | 12/2005 | |
| JP | 2007121048 A | | 5/2007 | |

(Continued)

OTHER PUBLICATIONS

CN-113960255-A (Year: 2022).*

(Continued)

*Primary Examiner* — Fatemeh Esfandiari Nia
(74) *Attorney, Agent, or Firm* — Maier & Maier, PLLC

(57) ABSTRACT

A chemical sensor system includes a first chemical sensor, a second chemical sensor unit, and a first sample atmosphere tank located between the first chemical sensor and the second chemical sensor unit, and includes an air supply mechanism that executes a first operation of supplying a sample atmosphere from the first chemical sensor to the first sample atmosphere tank, a second operation of supplying the sample atmosphere from the first sample atmosphere tank to the second chemical sensor unit, and a third operation of discharging the sample atmosphere in the first sample atmosphere tank.

17 Claims, 3 Drawing Sheets

(56) References Cited

FOREIGN PATENT DOCUMENTS

| JP | 2018185247 A | | 11/2018 |
|---|---|---|---|
| JP | 6577267 B2 | * | 9/2019 |
| JP | 2020-046263 A | | 3/2020 |
| JP | 2021-047051 A | | 3/2021 |
| JP | 2022-132756 A | | 9/2022 |

OTHER PUBLICATIONS

FR-2957150-A1 (Year: 2011).*
JP-6577267-B2 (Year: 2019).*
JP-3032831-B2 (Year: 2000).*
Office Action issued on May 27, 2025, in corresponding Japanese Application No. 2022-142256, 10 pages.

* cited by examiner

CHEMICAL SENSOR SYSTEM

CROSS-REFERENCE TO RELATED APPLICATIONS

This application is based upon and claims the benefit of priority from Japanese Patent Application No. 2022-142256 filed on Sep. 7, 2022, and the entire contents of which are incorporated herein by reference.

FIELD

Embodiments described herein relate generally to a chemical sensor system.

BACKGROUND

A chemical sensor that detects a target substance in a gas phase can be used for gas detection and odor detection by detecting a component released from a sample into the air.

Both high accuracy and responsiveness are required for gas detection and odor detection.

However, a sensor that detects a target substance in a gas phase responds in a short time, but may have difficulty in obtaining high selectivity.

On the other hand, a sensor that detects a target substance in a liquid phase can generally achieve high selectivity, but requires time to detect the target substance.

This problem may be solved by directly connecting the gas phase sensor and the liquid phase sensor to each other and simultaneously sensing the same sample.

If the gas phase sensor performs screening, and the liquid phase sensor continues sensing only for a sample to which the gas phase sensor has responded, it is possible to omit time for continuing sensing of a sample for which no response has been obtained in the screening of the gas phase sensor. However, in a case where a response has been obtained in the screening of the gas phase sensor, it is not possible to shift to sensing of a next sample until sensing of the liquid phase sensor is completed.

DETAILED DESCRIPTION

Figure 1:
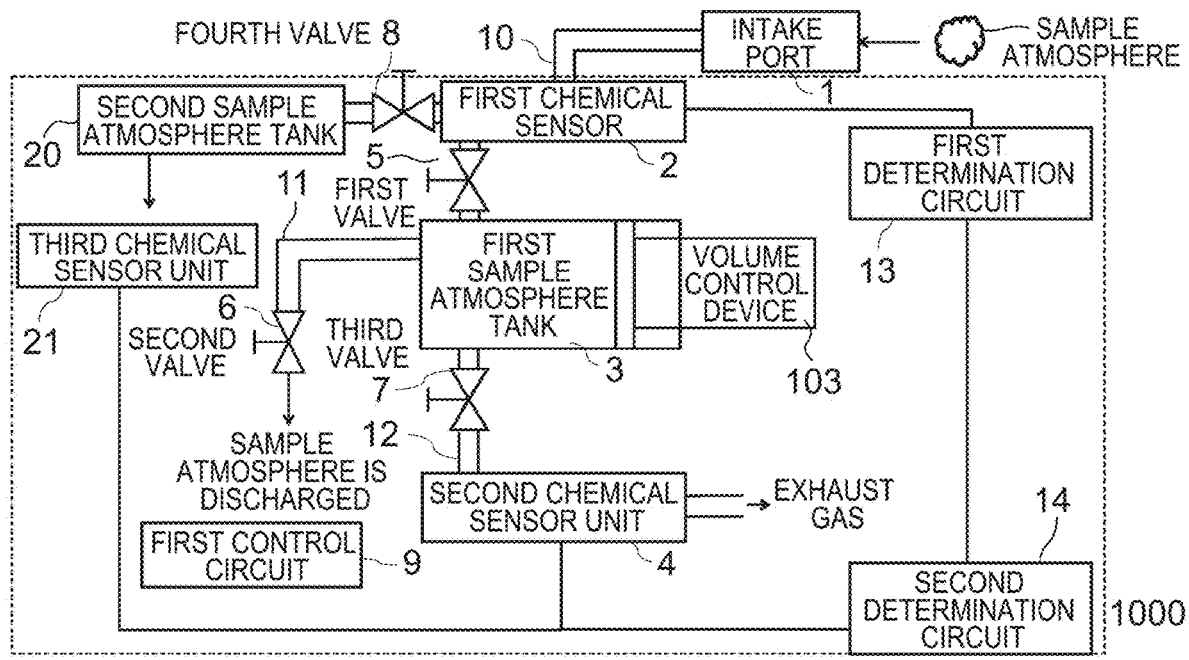
FIG. 1 is a block diagram illustrating an example of a chemical sensor system according to an embodiment.

Hereinafter, an embodiment will be described with reference to the drawings. Note that, in the following description, components that exhibit the same or similar functions are denoted by the same reference numerals throughout all the drawings, and redundant description will be omitted. Note that the drawings are schematic diagrams for promoting description of the embodiment and understanding thereof, and the shape, size, ratio, and the like in the drawings may be different from those of the actual device, but these can be appropriately modified in design in consideration of the following description and known techniques.

First Embodiment

A first embodiment provides a chemical sensor system including a first chemical sensor, a second chemical sensor unit, and a first sample atmosphere tank located between the first chemical sensor and the second chemical sensor unit, and including an air supply mechanism that executes a first operation of supplying a sample atmosphere from the first chemical sensor to the first sample atmosphere tank, a second operation of supplying the sample atmosphere from the first sample atmosphere tank to the second chemical sensor unit, and a third operation of discharging the sample atmosphere in the first sample atmosphere tank.

FIG. 1 is a schematic diagram of the chemical sensor system according to the first embodiment. The chemical sensor system according to the first embodiment will be described with reference to FIG. 1.

A chemical sensor system 1000 includes a first chemical sensor 2, a first sample atmosphere tank 3, a second chemical sensor unit 4, a first valve 5, a second valve 6, a third valve 7, a first control circuit 9, a first determination circuit 13, and a second determination circuit 14. The chemical sensor system 1000 is a system that detects a target substance (odor component) contained in a sample atmosphere. In the present specification, the odor component refers to a substance that can be detected in a gas phase or a liquid phase by a chemical sensor, and is not necessarily a substance that responds to an olfactory receptor of a living body. The chemical sensor system 1000 is a portion surrounded by the broken line in FIG. 1.

An intake port 1 is a sample atmosphere take-in portion. An airtight path 10 is connected to the intake port 1. Here, the airtight path refers to a structure capable of allowing gas to flow inside the path while maintaining airtightness with the outside. As the airtight path, a pipe made of resin or metal can be used. The intake port 1 is attached to an end portion of the airtight path 10 that takes in a sample atmosphere from an object, and has a thinly narrowed shape or a wide open shape according to a form of the object, or includes a packing or the like that is adsorbed to the object as necessary. The intake port 1 can include a pump or a fan as an air supply mechanism for transferring the sample atmosphere.

The first chemical sensor is a device that detects a target substance or a target substance group containing the target substance contained in an introduced sample atmosphere, and outputs an electric signal represented by a voltage value, a current value, or the like to the first determination circuit 13. The first chemical sensor 2 is a gas phase sensor. The first chemical sensor 2 is connected to the airtight path 10. A change in electric signal of a chemical sensor when a specific substance is present is expressed as a response. A substance to which the first chemical sensor 2 responds is expressed as a target substance group.

An airtight path 11 is an exhaust path. One end of the airtight path 11 is connected to the first sample atmosphere tank 3. The second valve 6 is connected to the other end of the airtight path 11. When the second valve 6 is opened, the airtight path 11 is released and is connected to, for example, the outside of the path.

The first sample atmosphere tank 3 collects the sample atmosphere supplied via the airtight path 10 and the first chemical sensor 2. Here, the first sample atmosphere tank 3 can include a volume control device 103, the first valve 5, the second valve 6, and the third valve 7 as an air supply mechanism. The first valve 5, the second valve 6, and the third valve 7 are opened and closed according to a signal input from the first control circuit 9. When a signal is input from the first control circuit 9, the volume control device 103 variably controls an internal volume of the tank. The volume control device 103 is, for example, a pump with an actuator. The air supply mechanism can be implemented by any configuration as long as the sample atmosphere can be supplied from the first chemical sensor 2 to the first sample atmosphere tank 3 and the sample atmosphere can be supplied from the first sample atmosphere tank 3 to the second chemical sensor unit 4. The air supply mechanism can also be implemented by a pump, a fan, and a valve disposed apart from the first sample atmosphere tank 3.

An airtight path 12 connects the first sample atmosphere tank 3 and the second chemical sensor unit 4 to each other. The airtight path 12 includes the third valve 7 so as to separate the first sample atmosphere tank 3 and the second chemical sensor unit 4 from each other.

The second chemical sensor unit 4 includes a second chemical sensor. The second chemical sensor is a device that detects a target substance or a target substance group containing the target substance contained in the introduced sample atmosphere, and outputs an electric signal represented by a voltage value, a current value, or the like to the second determination circuit 14. The second chemical sensor is a liquid phase sensor. The second chemical sensor unit 4 brings a substance contained in the introduced sample atmosphere into contact with a solvent to form a sample solution, and then brings the second chemical sensor into contact with the sample solution to perform detection. A substance to which the second chemical sensor responds is expressed as a target substance. The target substance is contained in the target substance group. The second chemical sensor has higher selectivity than the first chemical sensor 2. A second response time from introduction of the sample atmosphere into the second chemical sensor unit 4 until a response is obtained is longer than a first response time from introduction of the sample atmosphere into the first chemical sensor 2 until a response is obtained.

The first determination circuit 13 is a circuit that determines whether or not the first chemical sensor 2 has responded. The first determination circuit 13 is connected to a signal output of the first chemical sensor 2. The first determination circuit 13 analyzes an output signal of the first chemical sensor 2 and determines whether a specified amount or more of the target substance group containing the target substance is contained in the sample atmosphere. The first determination circuit 13 can store time when the first chemical sensor 2 has inspected a sample contained in the collected sample atmosphere and an inspection result thereof. The inspection time can be stored as time, or time information based on activation of the chemical sensor system 1000.

The first determination circuit 13 may specify the characteristic and the type of a substance contained in the sample atmosphere on the basis of the response of the first chemical sensor 2. A determination method of the first determination circuit 13 is not particularly limited, and can be appropriately selected according to the type and the characteristic of the first chemical sensor 2. For example, the first determination circuit 13 may determine whether or not the signal strength (signal intensity) of the first chemical sensor 2 is equal to or more than a specified value, or may compare the signal strength with a reference parameter held in the first determination circuit 13 to determine the similarity and identify the type of the substance. The first determination circuit 13 may be connected to an I/F and outputs a determination result to the I/F.

The second determination circuit 14 is a circuit that determines whether or not the second chemical sensor has responded. The second determination circuit 14 is connected to an output of the second chemical sensor described later. The second determination circuit 14 analyzes an output signal of the second chemical sensor, and determines whether a specified amount or more of the target substance is contained in the sample atmosphere inspected by the second chemical sensor after the first chemical sensor 2 responds. The second determination circuit 14 can store time when the sample atmosphere is inspected by the second chemical sensor and a result thereof. In addition, time when the sample atmosphere is collected by an intake port such as the intake port 1 and the inspection results of the first chemical sensor 2 and the second chemical sensor can be recorded in association with each other. As a result, the collected sample atmosphere can be synchronized with the sample atmosphere inspected by the first chemical sensor 2 and the second chemical sensor, and the inspection result of the collected sample atmosphere can be accurately managed. The second determination circuit 14 may be connected to an I/F (not illustrated), and can output a determination result to the I/F.

Each of first determination circuit 13 and second determination circuit 14 can be implemented as a dedicated circuit, or can be implemented as one central processing unit (CPU) that functions as each circuit. The first determination circuit 13 and the second determination circuit 14 each include one or more storage media that hold an inspection result, a reference parameter, and a program. The storage media of the first determination circuit 13, the second determination circuit 14, and the first control circuit 9 can be achieved as the same configuration sharing a function.

The first control circuit 9 controls the first to third valves 5 to 7 and the volume control device 103 in the chemical sensor system 1000 according to the present embodiment. In addition, the first control circuit 9 controls a valve connected to a second sample atmosphere tank 20 and a volume control device attached to the tank. The first control circuit 9 is connected to each of the above-described components and the first determination circuit 13, receives a signal of the first determination circuit 13 based on an inspection result of the first chemical sensor 2, and outputs a control signal to each of the above-described components. Furthermore, the first control circuit 9 can also receive a signal for starting collection of the sample atmosphere, and also outputs a control signal to each of the above-described components by the signal. The signal for starting collection of the sample atmosphere can be input by an operator using the chemical sensor system, or may be transmitted by automatic determination that the intake port 1 is in a sample atmosphere collection state by robot operation, image recognition, or the like. FIG. 1 illustrates an example in which the first control circuit 9 is connected to each of the above-described components and the first determination circuit 13 via wireless (not illustrated), but these may be connected to each other in a wired manner via a wiring line. In addition, a transmission path of the signal for starting collection of the sample atmosphere is not illustrated as an example of being connected via wireless, but may be connected in a wired manner via a wiring line. The first control circuit 9 controls a timing of opening and closing the first to third valves 5 to 7 and driving of the volume control device 103 according to an output of a control signal and a collection start signal of the sample atmosphere to control whether to collect the sample atmosphere in the sample atmosphere tank 3, to discharge the sample atmosphere collected in the sample atmosphere tank 3, or to send the sample atmosphere to the second chemical sensor unit 4. Furthermore, the first control circuit 9 similarly controls the second sample atmosphere tank 20, a valve connected to the second sample atmosphere tank 20, and a volume control device attached to the second sample atmosphere tank 20 to control whether to collect the sample atmosphere in the second sample atmosphere tank 20, to discharge the sample atmosphere collected in the sample atmosphere tank 20, or to send the sample atmosphere to a third chemical sensor unit 21.

The first control circuit 9 can implement control to each of the above-described components by causing a processor such as a CPU to execute a program. The control circuit includes, for example, an arithmetic device such as a CPU, a storage device connected to the arithmetic device and storing a program and data, and a signal generation device that generates a signal to be output to a component controlled by the control circuit.

FIG. 2 is a configuration diagram illustrating an example of the first chemical sensor in the chemical sensor system according to the embodiment.

Figure 2A:
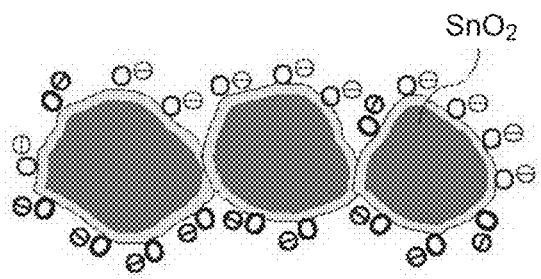
FIGS. 2A to 2C are configuration diagrams illustrating an example of a first chemical sensor in the chemical sensor system according to the embodiment.
Figure 2B:
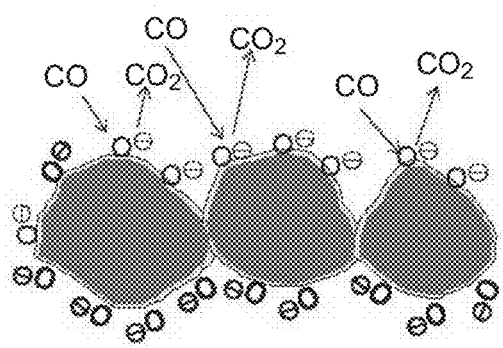
Figure 2C:
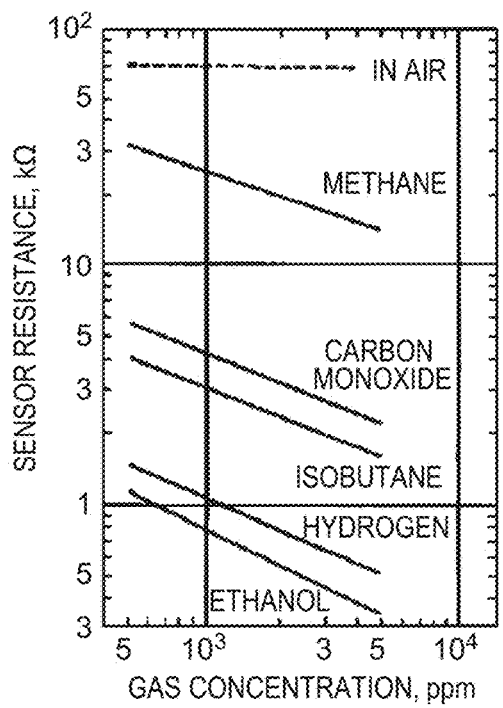

As an example of the first chemical sensor, a ceramic semiconductor type gas phase sensor device illustrated in FIG. 2 will be described. The gas phase sensor device is obtained by sintering, for example, an n-type semiconductor material such as tin oxide or zinc oxide in a porous shape. Since oxygen in the air is adsorbed to a surface of the n-type semiconductor in a state of being negatively charged, a depletion layer is formed in the vicinity of the surface of the n-type semiconductor as illustrated in FIG. 2A, and a high resistance state is obtained. Here, when the gas phase sensor device is exposed to a reducing atmosphere such as carbon monoxide in a high temperature state, carbon monoxide reacts with oxygen on the surface of the n-type semiconductor to reduce the oxygen adsorbed to the surface. Therefore, the depletion layer on the surface of the n-type semiconductor becomes thin, and a change to a low resistance state occurs as illustrated in FIG. 2B. This change depends on the concentration of carbon monoxide, and a similar phenomenon occurs in another combustible gas. By using such a principle, the concentrations of various combustible gases can be detected (FIG. 2C).

The gas phase sensor responds in a short time, but also responds to a substance having the same properties (physical properties such as reducibility and flammability) as a target substance (target substance group). As is clear from FIG. 2C, if the type of gas contained in the gas phase cannot be found, conversion into a concentration cannot be performed, and if the concentration cannot be found, the type of gas cannot be found. That is, it is difficult to apply the gas phase sensor to an application for inspecting an unknown sample atmosphere. Note that the type of the first chemical sensor and a detection method by the first chemical sensor are not limited to the ceramic semiconductor type sensor device as long as a gas phase is in contact with a sensor element, and any inspection device and inspection method such as a solid electrolyte type sensor or a sensor using a graphene FET can be used.

Figure 3:
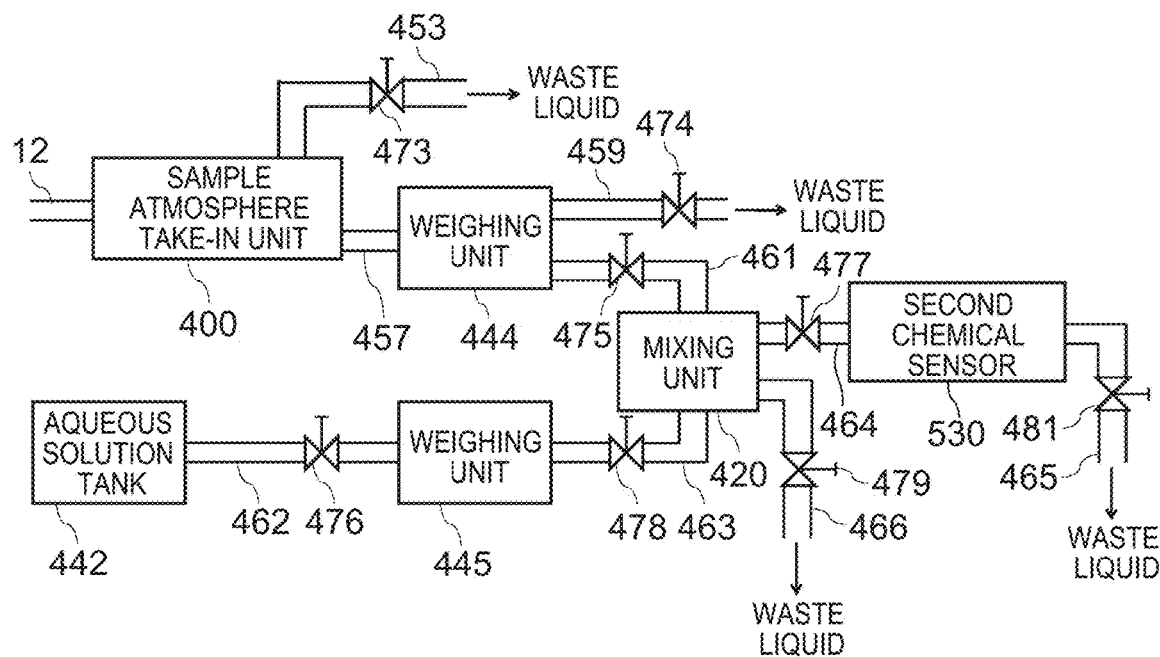
FIG. 3 is a schematic diagram illustrating an example of a second chemical sensor unit in the chemical sensor system according to the embodiment.

FIG. 3 is a schematic diagram illustrating an example of the second chemical sensor unit in the chemical sensor system according to the embodiment.

An example of the second chemical sensor unit will be described with reference to FIG. 3.

The second chemical sensor unit 4 includes a mechanism that exposes a sample atmosphere to a sensing solution, and the second chemical sensor that detects a content contained in the sensing solution to which the sample atmosphere is exposed.

Figure 4:
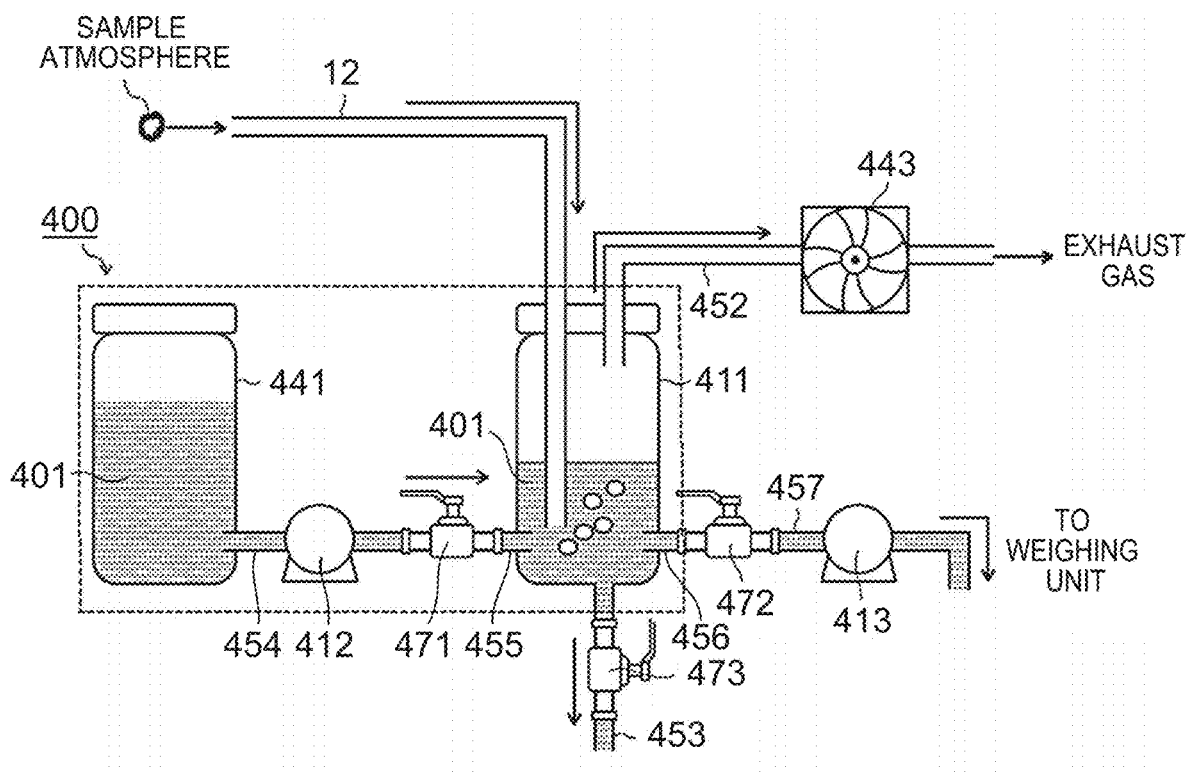
FIG. 4 is a schematic diagram illustrating an example of a sample atmosphere take-in unit in the chemical sensor system according to the embodiment.

The sample atmosphere take-in unit 400 is connected to the airtight path 12 and a pipe 452 (illustrated in FIG. 4). An intake and exhaust device 443 (illustrated in FIG. 4) is connected to the pipe 452 as necessary. The intake and exhaust device 443 is, for example, a pump or a fan. When the internal volume of the first sample atmosphere tank 3 is reduced using the volume control device 103 in a state where the first valve and the second valve illustrated in FIG. 1 are closed and the third valve is opened, the sample atmosphere is sent to a gas-liquid contact container 411 in the sample atmosphere take-in unit 400 via the airtight path 12. At this time, the sample atmosphere may be balanced with an exhaust gas from the gas-liquid contact container 411 using the intake and exhaust device 443 disposed as necessary.

The gas-liquid contact container 411 is connected to a supply source of an organic solvent. For example, the gas-liquid contact container 411 (illustrated in FIG. 4) is connected to an organic solvent tank 441 (illustrated in FIG. 4) storing an organic solvent via a pipe 454 (illustrated in FIG. 4), a pipe 455 (illustrated in FIG. 4), and a valve 471 (illustrated in FIG. 4). The organic solvent is a hydrophilic organic solvent, and is, for example, any one selected from the group consisting of a lower alcohol such as ethanol or methanol, dimethyl sulfoxide (DMSO), N,N-dimethylformamide (DMF), acetone, and acetonitrile.

The organic solvent is supplied from the organic solvent tank 441 to the gas-liquid contact container 411. The gas-liquid contact container 411 exposes the sample atmosphere that may contain a hydrophobic target molecule to the hydrophilic organic solvent.

The gas-liquid contact container 411 in the sample atmosphere take-in unit 400 is connected to a pipe 453 for discharging liquid, and a valve 473 is connected to the pipe 453. In addition, the gas-liquid contact container 411 in the sample atmosphere take-in unit 400 is connected to a weighing unit 444 via a pipe 456 (illustrated in FIG. 4), a valve 472 (illustrated in FIG. 4), and a pipe 457.

The organic solvent tank 441 is connected to the weighing unit 444 via the pipe 454, the valve 471, the pipe 456, the valve 472 (illustrated in FIG. 4), and the pipe 457.

The weighing unit 444 is connected to a pipe 459 for discharging liquid, and a valve 474 is connected to the pipe 459. In addition, the weighing unit 444 is connected to a mixing unit 420 via a pipe 461, and a valve 475 is connected to the pipe 461.

In addition, a supply source of an aqueous solution is connected to the mixing unit 420. For example, the mixing unit 420 is connected to an aqueous solution tank 442 storing an aqueous solution via a weighing unit 445. A valve 476 is connected to a pipe 462 connecting the aqueous solution tank 442 and the weighing unit 445 to each other. A valve 478 is connected to a pipe 463 connecting the mixing unit 420 and the weighing unit 445 to each other. Examples of the aqueous solution include a phosphate buffer, a HEPES buffer, and a Tris-hydrochloric acid buffer.

To the mixing unit 420, an organic solvent containing a target molecule is supplied from the sample atmosphere take-in unit 400, and an aqueous solution is further supplied from the aqueous solution tank 442. Then, the mixing unit 420 mixes the organic solvent containing the target molecule with the aqueous solution to prepare a sample liquid.

The mixing unit 420 is connected to a second chemical sensor 530 via a pipe 464. A valve 477 is connected to the pipe 464. In addition, the mixing unit 420 is connected to a pipe 466 for discharging liquid as necessary, and a valve 479 is connected to the pipe 466.

The second chemical sensor 530 is connected to a pipe 465 for discharging liquid, and a valve 481 is connected to the pipe 465.

Next, the sample atmosphere take-in unit will be described with reference to FIG. 4. FIG. 4 is a schematic diagram illustrating an example of the sample atmosphere take-in unit.

The sample atmosphere take-in unit includes the gas-liquid contact container 411 that bubbles a sample atmosphere into an organic solvent. The container 411 is connected to the organic solvent tank 441 via the pipe 454, the valve 471, and the pipe 455. A pump 412 is connected to the pipe 454. By opening the valve 471 and driving the pump 412, the organic solvent stored in the organic solvent tank 441 is supplied into the container 411.

One end portion of the airtight path 12 is connected to a sample atmosphere tank (not illustrated in FIG. 4). The other end portion of the airtight path 12 is located in the organic solvent 401 in the container 411. Furthermore, one end portion of the pipe 452 is located in a gas phase portion above the organic solvent 401 in the container 411, and the other end portion of the pipe 452 serves as an exhaust port. The intake and exhaust device 443 is connected to a portion between the container 411 and the exhaust port as necessary. When the internal volume of the first sample atmosphere tank 3 is reduced using the volume control device 103 in a state where the first valve and the second valve illustrated in FIG. 1 are closed and the third valve is opened, the sample atmosphere sent from the airtight path 12 is bubbled into the organic solvent 401 in the container 411, and the target molecule in the sample atmosphere is dissolved in the organic solvent 401.

Figure 5:
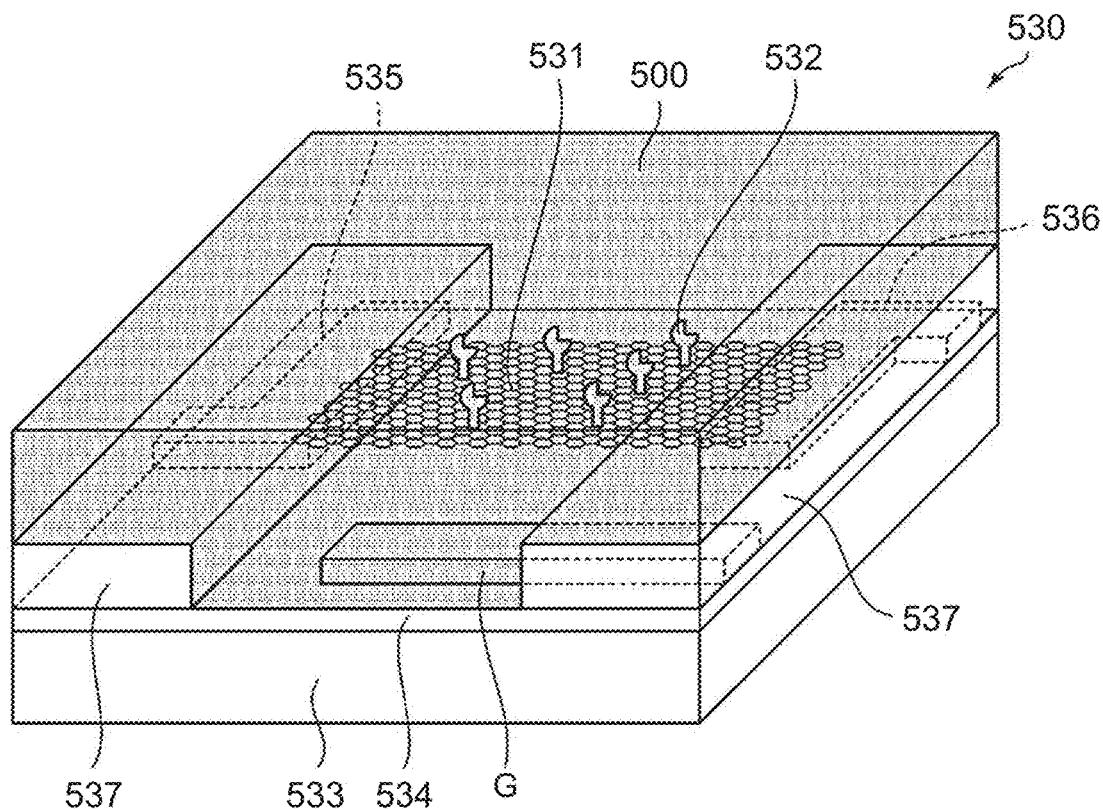
FIG. 5 is a perspective view illustrating an example of a second chemical sensor in the chemical sensor system according to the embodiment.

The container 411 is connected to the weighing unit 444 via the pipe 456, the valve 472, and the pipe 457. By opening the valve 472 and driving a pump 413, the organic solvent containing the target molecule in the container 411 is supplied to the weighing unit 444. The organic solvent remaining in the container 411 after a desired amount of the organic solvent is supplied to the weighing unit 444 is discharged from the pipe 453 by opening the valve 473. Furthermore, in order to clean the inside of the container 411, it is also possible to purge the inside of the container 411 with the organic solvent 401 without bubbling the sample atmosphere. Even in this case, the organic solvent 401 used for cleaning can be discharged through a similar path. FIG. 5 is a perspective view illustrating an example of the second chemical sensor in the chemical sensor system according to the embodiment.

Next, an example of the second chemical sensor will be described with reference to FIG. 5. The second chemical sensor is a liquid phase sensor.

The second chemical sensor 530 is, for example, a charge detection element including a graphene film 531. A surface of the second chemical sensor 530 (for example, a surface of the graphene film 531) is exposed to a sample liquid 500 obtained by mixing an organic solvent containing a target molecule with an aqueous solution in the mixing unit 420.

The second chemical sensor 530 has, for example, a field effect transistor (FET) structure.

The second chemical sensor 530 includes a substrate 533 and a base film 534 formed on the substrate 533. The graphene film 531 is formed on the base film 534.

Alternatively, the graphene film 531 may be formed on a surface of the substrate 533 without forming the base film 534. In addition, a circuit or a transistor (not illustrated) may be formed on the substrate 533.

As a material of the substrate 533, for example, silicon, silicon oxide, glass, or a polymer material can be used. The base film 534 is, for example, an insulating film such as a silicon oxide film. In addition, the base film 534 can also have a function of a chemical catalyst for forming the graphene film 531.

In addition, the second chemical sensor 530 includes at least two electrodes (a first electrode 535 and a second electrode 536). One of the first electrode 535 and the second electrode 536 functions as a drain electrode, and the other functions as a source electrode.

The first electrode 535 and the second electrode 536 are covered with a protective insulating film 537 as necessary. The protective insulating film 537 is made of, for example, aluminum oxide, silicon oxide, or a polymer material.

On the base film 534 of the second chemical sensor 530, gate wiring G is further formed as necessary, and a part thereof is exposed without being covered with the protective insulating film 537. A portion of the gate wiring G exposed from the protective insulating film 537 is made of gold, platinum, silver, a silver/silver chloride laminated film, or the like.

Note that the gate wiring G only needs to be in contact with the sample liquid 500 in the vicinity of the second chemical sensor 530, and therefore does not have to be necessarily formed on the second chemical sensor 530. For example, the gate wiring G may be formed on an element different from the second chemical sensor 530 and connected to the second chemical sensor 530 via the sample liquid 500.

The graphene film 531 is formed between the first electrode 535 and the second electrode 536. The first electrode 535 and the second electrode 536 are electrically in contact with the graphene film 531. A current can flow between the first electrode 535 and the second electrode 536 through the graphene film 531.

The second chemical sensor 530 further includes a probe molecule 532 that selectively associates with a target molecule on a surface thereof. The probe molecule 532 is bonded or adsorbed to a surface of the graphene film 531. The probe molecule has a property of being specifically bonded or adsorbed to a target substance, and can be arbitrarily changed according to the target substance. As the probe molecule, a nucleic acid, an enzyme, a peptide, or a synthetic molecule or a derivative containing these can be used, but the probe molecule is not particularly limited.

A sensor element surface including the graphene film 531 is exposed to the inside of a flow path through which the sample liquid 500 is supplied. A surface of the graphene film 531, the probe molecule 532, and the gate wiring G are exposed to the sample liquid 500.

FIG. 6 is a schematic diagram of a second chemical sensor mounting portion in the chemical sensor system according to the embodiment.

Figure 6A:
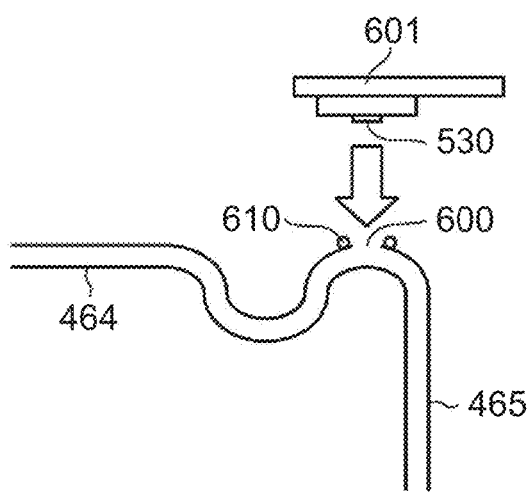
FIGS. 6A and 6B are schematic diagrams of a second chemical sensor mounting portion in the chemical sensor system according to the embodiment.
Figure 6B:
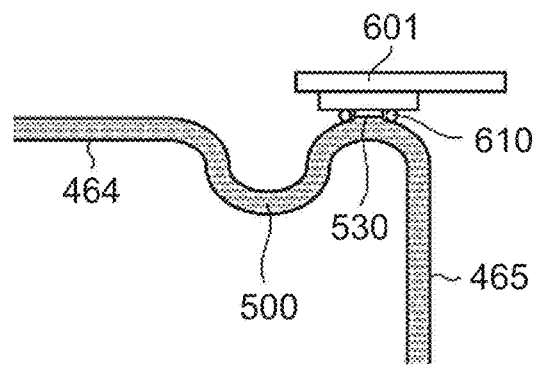

As illustrated in FIG. 6A, in the pipe 464 and the pipe 465, a window 600 is opened in the second chemical sensor mounting portion, and a packing 610 is formed on an outer periphery of the window 600. The second chemical sensor 530 is mounted on a cartridge substrate 601. As illustrated in FIG. 6B, when being disposed with a sensor element surface facing the window 600, the second chemical sensor 530 is airtightly sealed by the packing 610, and the sensor element surface is exposed to the insides of the pipes 464 and 465. With such a form, the second chemical sensor 530 can be attached and detached as a replacement part or a consumable part.

The second chemical sensor 530 electrically detects that the probe molecule 532 is associated with a target molecule. When the probe molecule 532 recognizes and captures the target molecule, the target molecule comes close to a surface of the graphene film 531. Therefore, an electronic state of the graphene film 531 changes depending on, for example, a charge and polarization of the target molecule, an electron attraction/donating property, and the like. By electrically detecting this change, the presence and concentration of the target molecule can be found.

Note that by applying a desired gate potential to the sample liquid via the gate electrode when electrically detecting the electronic state of the graphene film 531, it is possible to adjust the electrical characteristics of the graphene to a state of high sensitivity.

Alternatively, by measuring a source-drain current of the graphene while performing scanning for a gate potential, it is possible to measure a charge neutral point at which carriers flowing in the graphene switch between holes and electrons, and it is possible to find an injection state of charges into the graphene.

Note that the surface of the graphene film 531 may be covered with an insulator as necessary. As the insulator, for example, a peptide β sheet or a phospholipid film can be used.

An operation of the chemical sensor unit 1000 will be described. The operation described below is implemented by controlling operations of the first to third valves 5 to 7 and the volume control device 103 by the first control circuit 9. The operations 1 to 7 described below may be performed simultaneously by different components.

Operation 1. The air supply mechanism supplies the sample atmosphere from the first chemical sensor 2 to the first sample atmosphere tank 3. For example, when the volume control device 103 increases the internal volume of the first sample atmosphere tank 3 in a state where the first valve 5 is opened and the second and third valves 6 and 7 are closed, the inside of the first sample atmosphere tank 3 is decompressed. The sample atmosphere flows into the first sample atmosphere tank 3 via the airtight path 10.

Operation 2. The first chemical sensor 2 senses the inflow sample atmosphere.

Operation 3. The first determination circuit 13 determines whether or not the first chemical sensor 2 has responded. If the first chemical sensor 2 has not responded, it is determined that the target substance or the sample substance group is not contained in the sample atmosphere, and the process proceeds to operation 4. If the first chemical sensor 2 has responded and the second chemical sensor unit 4 does not perform a sensing operation, it is determined that the sample atmosphere contains the sample substance group, and the process proceeds to operation 5. If the first chemical sensor 2 has responded and the second chemical sensor unit 4 performs the sensing operation, the process proceeds to operation 5 after the second chemical sensor unit 4 completes the sensing operation (after operation 7 with respect to the previous sample atmosphere is completed).

Operation 4. The air supply mechanism discards the sample atmosphere collected in the first sample atmosphere tank 3. For example, when the volume control device 103 reduces the internal volume of the first sample atmosphere tank while the first valve 5 and the third valve 7 are closed and the second valve 6 is opened, the sample atmosphere collected in the first sample atmosphere tank 3 is discharged. After the sample atmosphere is completely discharged, the process returns to operation 1, or the operation is stopped, and the chemical sensor system 1000 enters a standby state.

Operation 5. The air supply mechanism supplies the sample atmosphere from the first sample atmosphere tank 3 to the second chemical sensor unit 4. For example, when the volume control device 103 reduces the internal volume of the first sample atmosphere tank while the first valve 5 and the second valve 6 are closed and the third valve 7 is opened, the sample atmosphere collected in the first sample atmosphere tank 3 is sent to the second chemical sensor unit 4.

Operation 6. The second chemical sensor unit 4 senses the inflow sample atmosphere.

Operation 7. The second determination circuit 14 determines whether or not the second chemical sensor has responded. It is determined whether or not the target substance is contained in the sample atmosphere according to a determination result.

As illustrated in the above operations 1 to 7, the second chemical sensor having high selectivity but requiring a long response time performs sensing when the first chemical sensor 2 requiring a short response time has responded. As long as the first chemical sensor 2 does not respond while the second chemical sensor unit performs sensing, the first chemical sensor 2 can continuously sense a large amount of sample atmosphere by repeating the operations 1 to 4. The first chemical sensor 2 and the second chemical sensor unit 4 can simultaneously execute a sensing operation. The chemical sensor system 1000 can improve the amount of a sample that can be processed per unit time (sensing speed) while maintaining high selectivity.

A component arbitrarily disposed in the chemical sensor system according to the embodiment will be described. The chemical sensor system according to the present embodiment may further include a third chemical sensor unit 21 and a second sample atmosphere tank 20 located between the first chemical sensor 2 and the third chemical sensor unit 21. The third chemical sensor unit 21 has a similar configuration to the second chemical sensor unit. The second sample atmosphere tank 20 has a similar configuration to the first sample atmosphere tank 3. The chemical sensor system 1000 further includes an air supply mechanism that performs a fourth operation of supplying a sample atmosphere to be inspected by the first chemical sensor 2 to the second sample atmosphere tank, a fifth operation of supplying the sample atmosphere in the second sample atmosphere tank to the third chemical sensor unit, and a sixth operation of discharging the sample atmosphere in the second sample atmosphere tank.

The second sample atmosphere tank 20 is connected to the first chemical sensor 2, and a fourth valve 8 is disposed between the first chemical sensor 2 and the second sample atmosphere tank 20. When the first valve 5 is opened, the fourth valve 8 is closed. When the fourth valve 8 is opened, the first valve 5 is closed. As a result, while a sample atmosphere is inspected in the second chemical sensor unit 4, another sample atmosphere is newly collected in the second sample atmosphere tank 20, and a next inspection can be performed in the first chemical sensor 2. Furthermore, conversely, while a sample atmosphere is inspected (sensed) in the third chemical sensor unit 21, another sample atmosphere can be newly collected in the first sample atmosphere tank 3, and a next inspection can be performed in the first chemical sensor 2. As a result, it is possible to shorten one cycle time of the inspection in the chemical sensor system 1000 according to the present embodiment. Note that the fourth valve 8 is closed when the sample atmosphere is taken into the first sample atmosphere tank 3.

The second sample atmosphere tank 20 has the same specifications as the first sample atmosphere tank 3, and includes a volume control device (not illustrated). In addition, a valve (not illustrated) corresponding to the third valve 7 is also disposed between the second sample atmosphere tank 20 and the third chemical sensor unit 21, and an airtight path and a valve corresponding to the airtight path 11 and the second valve 6 are also connected to the second sample atmosphere tank 20 (not illustrated). When the sample atmosphere is collected in the second sample atmosphere tank 20, it is only required to perform the same operation as when the sample atmosphere is collected in the first sample atmosphere tank 3, and at this time, it is only required to close the first valve 5 and to open the fourth valve 8.

The second determination circuit 14 described above is also connected to an output of the third chemical sensor unit 21. The second determination circuit 14 analyzes an output signal of a third chemical sensor in addition to the second chemical sensor, and determines whether a specified amount or more of the target substance is contained in the sample atmosphere inspected by the second chemical sensor or the third chemical sensor after an inspection result of the first chemical sensor becomes positive.

The second determination circuit 14 can store time and results thereof when the sample atmosphere is inspected by the second chemical sensor and the third chemical sensor. In addition, time when the sample atmosphere is collected by an intake port such as the intake port 1 and the inspection results of the first chemical sensor 2 and the second chemical sensor or the inspection results of the first chemical sensor 2 and the third chemical sensor can be recorded in association with each other. As a result, the collected sample atmosphere can be synchronized with the sample atmosphere inspected by the first chemical sensor 2 and the second chemical sensor, or the collected sample atmosphere can be synchronized with the sample atmosphere inspected by the first chemical sensor 2 and the third chemical sensor, and the inspection result of the collected sample atmosphere can be accurately managed.

The third chemical sensor unit 21, the second sample atmosphere tank 20, and the volume control device (not illustrated) also execute similar operations to the operations 1 to 7 described above. Note that the first control circuit 9 exclusively performs control such that the system including the second chemical sensor unit 4, the first sample atmosphere tank 3, and the volume control device 103 and the system including the third chemical sensor unit 21, the second sample atmosphere tank 20, and the volume control device (not illustrated) do not simultaneously execute the operation 1 to 3. The first control circuit 9 controls the operation 4 to 7 of one of the systems independently of the operation 4 to 7 of the other system.

Note that here, the second sample atmosphere tank and the third chemical sensor unit having the same configuration as the first sample atmosphere tank and the second chemical sensor unit have been described as an example, but a set of a sample atmosphere tank and a chemical sensor unit having a similar configuration may be further added.

The chemical sensor system according to the first embodiment includes a first chemical sensor, a second chemical sensor unit, and a first sample atmosphere tank located between the first chemical sensor and the second chemical sensor unit, and includes an air supply mechanism that executes a first operation of supplying a sample atmosphere from the first chemical sensor to the first sample atmosphere tank, a second operation of supplying the sample atmosphere from the first sample atmosphere tank to the second chemical sensor unit, and a third operation of discharging the sample atmosphere in the first sample atmosphere tank. This makes it possible to detect a target substance with high accuracy and responsiveness.

Several embodiments of the present invention have been described. However, these embodiments have been presented by way of example and are not intended to limit the scope of the invention. These novel embodiments can be performed in various other forms, and various omissions, substitutions, and changes can be made without departing from the spirit of the invention. These embodiments and modifications thereof are included in the scope and gist of the invention, and are included in the invention described in claims and an equivalent scope thereto.

Hereinafter, the invention according to the embodiment will be additionally described.

[1] A chemical sensor system including: a first chemical sensor; a second chemical sensor unit; and a first sample atmosphere tank located between the first chemical sensor and the second chemical sensor unit, and including an air supply mechanism that executes a first operation of supplying a sample atmosphere from the first chemical sensor to the first sample atmosphere tank, a second operation of supplying the sample atmosphere from the first sample atmosphere tank to the second chemical sensor unit, and a third operation of discharging the sample atmosphere in the first sample atmosphere tank.

[2] The chemical sensor system according to [1], in which the second chemical sensor unit includes: a mechanism that exposes the sample atmosphere to a sensing solution; and a second chemical sensor that detects a content contained in the sensing solution to which the sample atmosphere is exposed.

[3] The chemical sensor system according to [1] or [2], in which the first chemical sensor is a gas phase sensor.

[4] The chemical sensor system according to [2], in which the second chemical sensor is a liquid phase sensor.

[5] The chemical sensor system according to any one of [1] to [4], further including a valve located between the first sample atmosphere tank and the second chemical sensor unit.

[6] The chemical sensor system according to [5], in which the valve is opened and closed on the basis of an inspection result of the first chemical sensor.

[7] The chemical sensor system according to any one of [1] to [6], in which the first chemical sensor has an intake port for collecting the sample atmosphere.

[8] The chemical sensor system according to [7], in which time when the sample atmosphere is collected at the intake port and inspection results of the first chemical sensor and the second chemical sensor are recorded in association with each other.

[9] The chemical sensor system according to any one of [1] to [8], in which the sample atmosphere passes through the first chemical sensor and is collected in the first sample atmosphere tank.

[10] The chemical sensor system according to any one of [1] to [9], further including: a third chemical sensor unit; and a second sample atmosphere tank located between the first chemical sensor and the third chemical sensor unit, and including an air supply mechanism that executes a fourth operation of supplying a sample atmosphere to be inspected by the first chemical sensor to the second sample atmosphere tank, a fifth operation of supplying the sample atmosphere in the second sample atmosphere tank to the third chemical sensor unit, and a sixth operation of discharging the sample atmosphere in the second sample atmosphere tank.

[11] The chemical sensor system according to [10], in which the third chemical sensor unit includes: a mechanism that exposes the sample atmosphere to a sensing solution; and a third chemical sensor that detects a content contained in the sensing solution to which the sample atmosphere is exposed.

[12] The chemical sensor system according to [11], in which the third chemical sensor is a liquid phase sensor.

[13] The chemical sensor system according to any one of [10] to [12], further including a valve located between the second sample atmosphere tank and the third chemical sensor unit.

[14] The chemical sensor system according to [13], in which the valve is opened and closed on the basis of an inspection result of the first chemical sensor.

[15] The chemical sensor system according to any one of [10] to [14], in which the first chemical sensor has an intake port for collecting the sample atmosphere.

[16] The chemical sensor system according to [15], in which time when the sample atmosphere is collected at the intake port and inspection results of the first chemical sensor and the third chemical sensor are recorded in association with each other.

[17] The chemical sensor system according to any one of [10] to [16], in which the sample atmosphere passes through the first chemical sensor and is collected in the second sample atmosphere tank.

[18] The chemical sensor system according to any one of [1] to [17], in which the air supply mechanism is controlled to discharge the sample atmosphere in the first sample atmosphere tank when the first chemical sensor does not respond.

[19] The chemical sensor system according to any one of [1] to [17], in which the air supply mechanism is controlled to supply the sample atmosphere from the first sample atmosphere tank to the second chemical sensor unit when the first chemical sensor responds.

[20] The chemical sensor system according to any one of [2] to [19], in which the air supply mechanism is controlled such that, after the sample atmosphere is supplied to the second chemical sensor unit, the second chemical sensor executes sensing of the sample atmosphere, and another sample atmosphere is supplied from the first chemical sensor to the first sample atmosphere tank.

What is claimed is:

1. A chemical sensor system comprising:
a first chemical sensor;
a second chemical sensor unit; and
a first sample atmosphere tank located between the first chemical sensor and the second chemical sensor unit, and including
an air supply mechanism that executes a first operation of supplying a sample atmosphere from the first chemical sensor to the first sample atmosphere tank, a second operation of supplying the sample atmosphere from the first sample atmosphere tank to the second chemical sensor unit, and a third operation of discharging the sample atmosphere in the first sample atmosphere tank,
wherein the second chemical sensor unit comprises: a mechanism that exposes the sample atmosphere to a sensing solution; and a second chemical sensor that responds to a target substance contained in the sensing solution to which the sample atmosphere is exposed,
wherein the first chemical sensor is a gas phase sensor and the second chemical sensor is a liquid phase sensor.

2. The chemical sensor system according to claim 1, further comprising a valve located between the first sample atmosphere tank and the second chemical sensor unit.

3. The chemical sensor system according to claim 2, wherein the valve is opened and closed on a basis of an inspection result of the first chemical sensor.

4. The chemical sensor system according to claim 1, wherein the first chemical sensor has an intake port for collecting the sample atmosphere.

5. The chemical sensor system according to claim 4, wherein time when the sample atmosphere is collected at the intake port and inspection results of the first chemical sensor and the second chemical sensor are recorded in association with each other.

6. The chemical sensor system according to claim 1, wherein the sample atmosphere is collected in the first sample atmosphere tank through the first chemical sensor.

7. The chemical sensor system according to claim 1, further comprising:
a third chemical sensor unit; and
a second sample atmosphere tank located between the first chemical sensor and the third chemical sensor unit, and including
an air supply mechanism that executes a fourth operation of supplying a sample atmosphere to be inspected by the first chemical sensor to the second sample atmosphere tank, a fifth operation of supplying the sample atmosphere in the second sample atmosphere tank to the third chemical sensor unit, and a sixth operation of discharging the sample atmosphere in the second sample atmosphere tank.

8. The chemical sensor system according to claim 7, wherein the third chemical sensor unit comprises: a mechanism that exposes the sample atmosphere to a sensing solution; and a third chemical sensor that detects a content contained in the sensing solution to which the sample atmosphere is exposed.

9. The chemical sensor system according to claim 8, wherein the third chemical sensor is a liquid phase sensor.

10. The chemical sensor system according to claim 7, further comprising a valve located between the second sample atmosphere tank and the third chemical sensor unit.

11. The chemical sensor system according to claim 10, wherein the valve is opened and closed on a basis of an inspection result of the first chemical sensor.

12. The chemical sensor system according to claim 7, wherein the first chemical sensor has an intake port for collecting the sample atmosphere.

13. The chemical sensor system according to claim 12, wherein time when the sample atmosphere is collected at the intake port and inspection results of the first chemical sensor and the third chemical sensor are recorded in association with each other.

14. The chemical sensor system according to claim 7, wherein the air sample atmosphere is collected in the second sample atmosphere tank through the first chemical sensor.

15. The chemical sensor system according to claim 1, wherein the air supply mechanism is controlled to discharge the sample atmosphere in the first sample atmosphere tank when the first chemical sensor does not respond.

16. The chemical sensor system according to claim 1, wherein the air supply mechanism is controlled to supply the sample atmosphere from the first sample atmosphere tank to the second chemical sensor unit when the first chemical sensor responds.

17. The chemical sensor system according to claim 1, wherein the air supply mechanism is controlled such that, after the sample atmosphere is supplied to the second chemical sensor unit, the second chemical sensor executes sensing of the sample atmosphere, and another sample atmosphere is supplied from the first chemical sensor to the first sample atmosphere tank.

* * * * *